No. 816,182.    PATENTED MAR. 27, 1906.
H. E. PROUTY.
TIRE ARMOR.
APPLICATION FILED JUNE 26, 1905.

2 SHEETS—SHEET 1.

Witnesses
J. C. Simpson
E. M. Telford

Inventor
H. E. Prouty
By Chandlee & Chandlee
Attorneys

No. 816,182. PATENTED MAR. 27, 1906.
H. E. PROUTY.
TIRE ARMOR.
APPLICATION FILED JUNE 26, 1905.

2 SHEETS—SHEET 2.

Witnesses
J. C. Simpson
E. M. Calford

Inventor,
H. E. Prouty
By Chandlee & Chandlee
Attorneys

UNITED STATES PATENT OFFICE.

HOMER E. PROUTY, OF GENOA, ILLINOIS.

TIRE-ARMOR.

No. 816,182.  Specification of Letters Patent.  Patented March 27, 1906.

Application filed June 26, 1905. Serial No. 266,990.

*To all whom it may concern:*

Be it known that I, HOMER E. PROUTY, a citizen of the United States, residing at Genoa, in the county of Dekalb, State of Illinois, have invented certain new and useful Improvements in Tire-Armors; and I do hereby declare the following to be a full, clear, and exact description of the invention, such as will enable others skilled in the art to which it appertains to make and use the same.

This invention relates to vehicle-wheel attachments, and more particularly to traction or automobile wheels.

One object of the invention is to provide an attachment to vehicle-wheels embodying such characteristics as to prevent slipping of the wheels.

Another object of the invention is to provide an attachment designed to be applied to automobile or other vehicle wheels in such manner as to protect the tires thereof and to prevent slipping of the wheels.

A still further object of the invention resides in the provision of means arranged in sections for detachable engagement with vehicle-wheels to prevent slipping thereof, and thereby aid in the driving power of the wheels.

With these and other objects in view the present invention consists in the combination and arrangement of parts, as will be hereinafter more fully described, shown in the accompanying drawings, and particularly pointed out in the appended claims, it being understood that changes in the form, proportion, size, and minor details may be made within the scope of the claims without departing from the spirit or sacrificing any of the advantages of the invention.

Figure 1:
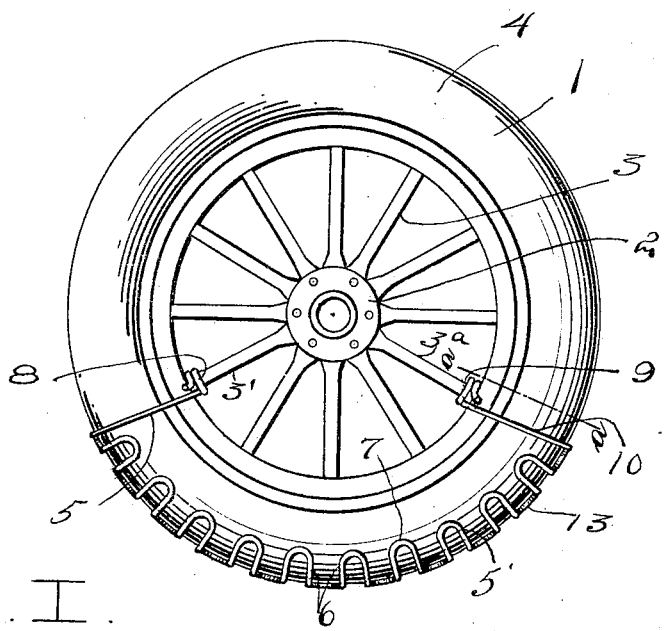
Figure 2:
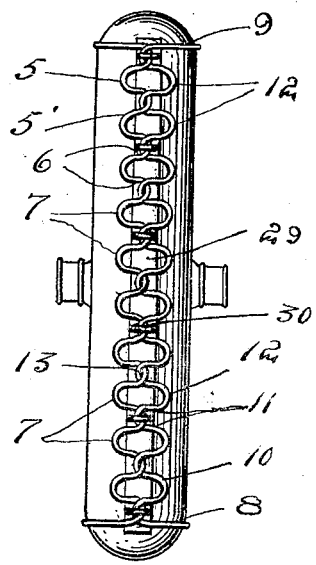
Figure 3:
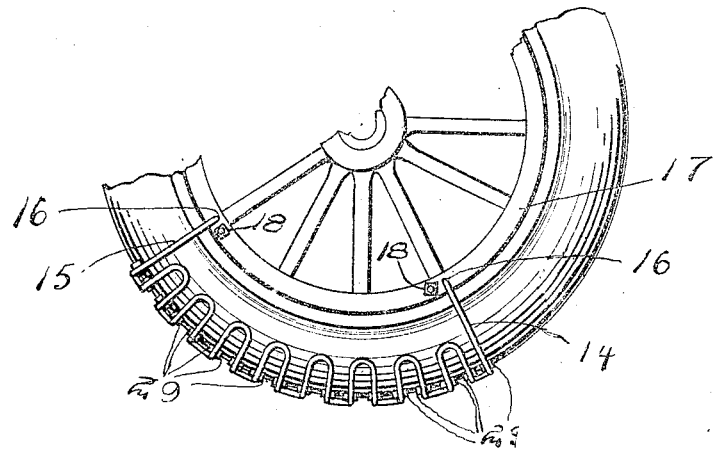
Figure 4:
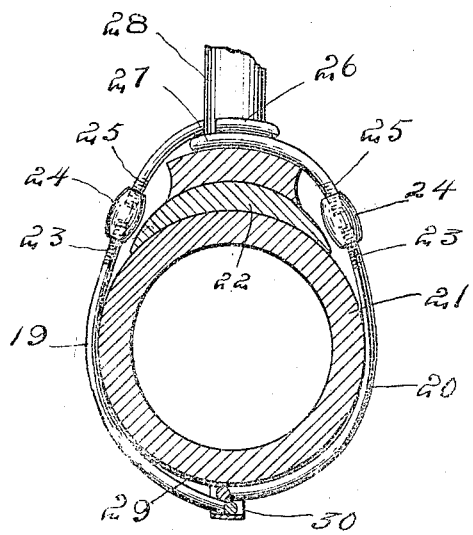

In the drawings, Figure 1 is an elevation of a wheel having my attachment secured thereto. Fig. 2 is a top plan view of a wheel, illustrating one section of my attachment. Fig. 3 is an elevation of a wheel having one section of my attachment secured thereto, illustrating a modified form of means for securing the ends of each element of each section to the wheel. Fig. 4 is a sectional view on the line *a a* of Fig. 1.

Referring now more particularly to the accompanying drawings, the reference character 1 designates a wheel, including a hub 2, spokes 3, and a rubber tire 4, all of which may be of any form and material employed for the purpose.

The reference character 5 designates a wire bent at one of its ends to embrace the spoke 3', with its body portion bent at intervals, as at 5', to form parallel portions 6 and the bight portion 7, the bight portions being arranged alternately at the corresponding ends of the parallel portions of the wire 5, the opposite end of the said wire being bent alongside of the rubber tire and the felly and being bent around the spoke 3ª above the felly, the opposite bent ends of the said wire 5 being bent in the form of hooks to engage the aforesaid spokes. Secured to the respective spokes 3' and 3ª are the hooked ends 8 and 9 of another piece of wire 10, which is also bent to form parallel members 11, the bight portions 12 of the parallel members being arranged alternately at the sides of the said wire 10 and the inner bight portions of each wire 5 and 10 being interlaced or interlocked, as designated by the reference character 13. The hooked ends of each piece of wire 5 and 10 may be formed so as to be sprung into engagement with the respective spokes. It will be seen that there is employed a series of sections of the interlocked bent wires, so that the outer surfaces or periphery of the rubber tire may be completely protected from wear and to facilitate the driving of the vehicle by reason of the inability of the wheels slipping when employing my attachment.

Instead of bending the ends of the wires 10 and 11 around the spokes of the vehicle the ends 14 and 15 may be passed through openings 16 in the felly 17 and screw-threaded at their extremities for engagement of a nut 18. In other words, both ends of each wire of each section may be passed through the fellies and provided with a suitable nut to prevent detachment of the armor from the tire. This latter construction is clearly shown in Fig. 3, to which attention is invited, in connection with the description just alluded to.

There is shown still another means of connecting the ends of each bent wire to the spokes. For instance, the ends 19 and 20 of each bent wire is directed upwardly alongside of the rubber tire 21, terminating at the base of the felly 22, the free ends of the wires being screw-threaded, as at 23, for engagement therewith of a nut 24, whose opposite ends receive the screw-threaded ends 25 of the hooked members 26 and 27, respectively, of the wires 19 and 20, the said hooked elements 26 and 27 embracing a corresponding spoke 28 one above the other and directly upon the felly 22. By reason of this nut engagement 24 the wires may be readily removed from engagement with the tire by disengaging the ends, and it is obvious that by reason of the said nuts the said wires may be readily tightened upon the tire.

It will thus be seen that the body of my improved armor or roughened-surface attachment for the tires may be connected to the wheels through the instrumentality of various methods, and I wish it understood that, if desired, a piece of leather or other suitable material 29 may be secured between the periphery of the rubber tire and the innerface of the armor to protect the tire against wear occasioned by the engagement therewith of the armor. If this leather or similar material 29 is employed, it will be secured directly to the armor at the point of interlocking engagement by means of a strap or other suitable fastening 30.

It will now be understood that while I have described various methods of securing the armor to the wheel I may employ other methods for the same purpose without departing from the spirit and scope of my invention so long as I confine myself to the scope of my claims.

The main feature of my invention resides in the provision of means to prevent slipping of the wheels and to protect the rubber tires from wear, it being obvious that by reason of the peculiar formation of each pair of wires and interlocking each pair of each section together slipping of the wheels is positively prevented, permitting of firm engagement of the wheels with the road-bed, and consequently providing a positive drive of the wheels.

While I have stated that the armor is composed of wire, it is to be understood that other material may be employed, if desired. At any rate I prefer strong steel with spring temper, as the attachment would then be strong and not break when striking an obstruction. I might under certain conditions prefer to form the attachment of brass.

What is claimed is—

1. A wheel, including a rubber tire provided with interlocking elements arranged upon the periphery of the tire, each element having its ends secured to the spokes of the wheel.

2. A wheel, including a rubber tire provided with elements arranged longitudinally of the tire in pairs, each pair of said elements having its inner longitudinal edge interlocked with the inner longitudinal edge of its companion element, the ends of each element of each pair being secured to the wheel.

3. A wheel, including a rubber tire provided with elements arranged longitudinally of the tire in pairs, each pair of said elements having its inner longitudinal edge interlocked with the inner longitudinal edge of its companion element, the ends of each element of each pair being detachably secured to the wheel.

4. A wheel, including a rubber tire provided with interlocking elements arranged upon the periphery of the tire, each element having its ends detachably secured to the spokes of the wheel.

5. As an article of manufacture, an armor for vehicle-tires consisting of pairs of interlocking elements having flexible material secured thereto at their point of interlocking engagement.

In testimony whereof I affix my signature in presence of two witnesses.

HOMER E. PROUTY.

Witnesses:
T. U. AUSTIN,
P. E. STOTT.